C. ROBINSON.
APPARATUS FOR RECOVERING VALUES FROM ORE SOLUTIONS.
APPLICATION FILED OCT. 3, 1908.
954,466.
Patented Apr. 12, 1910.
2 SHEETS—SHEET 2.
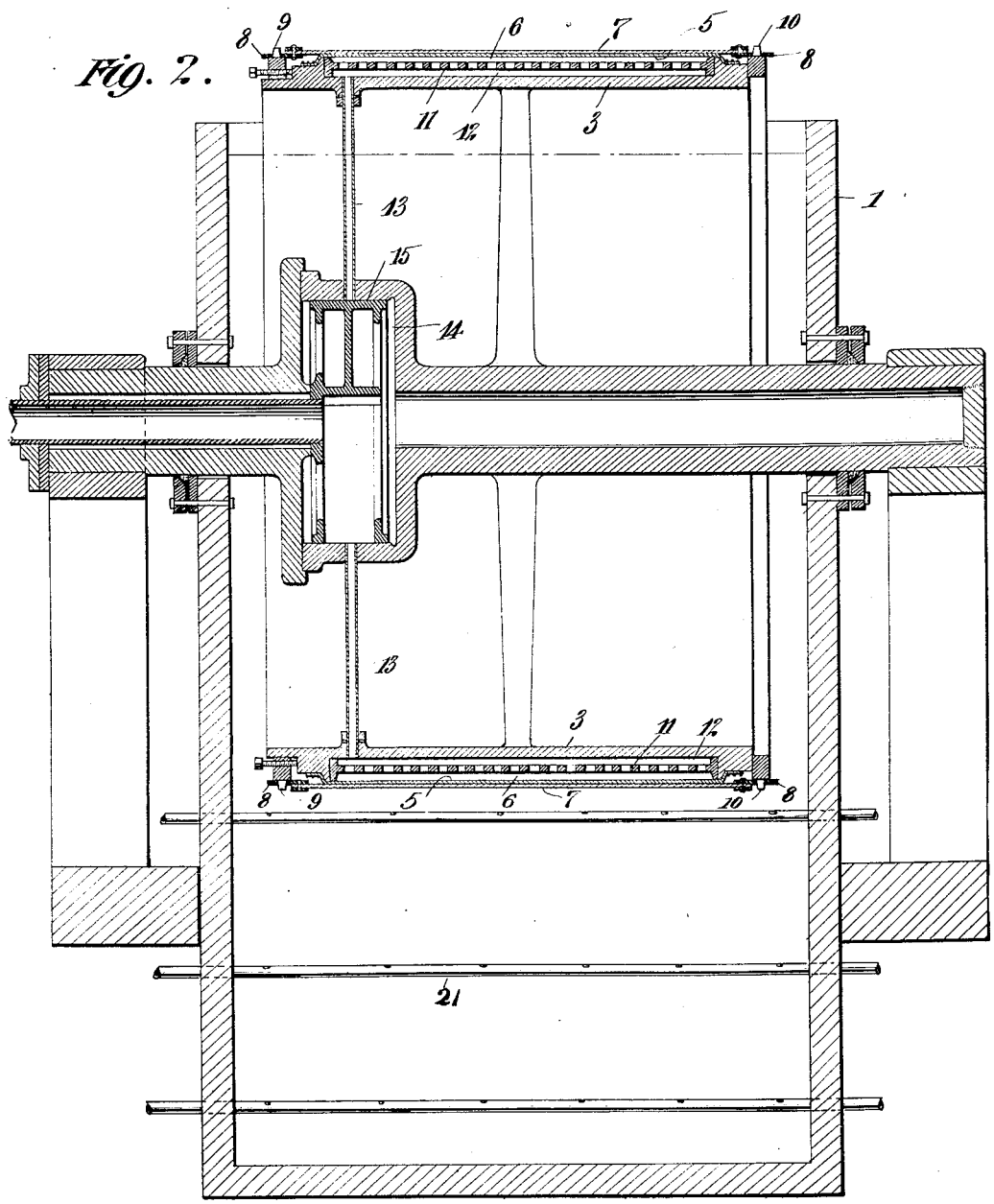

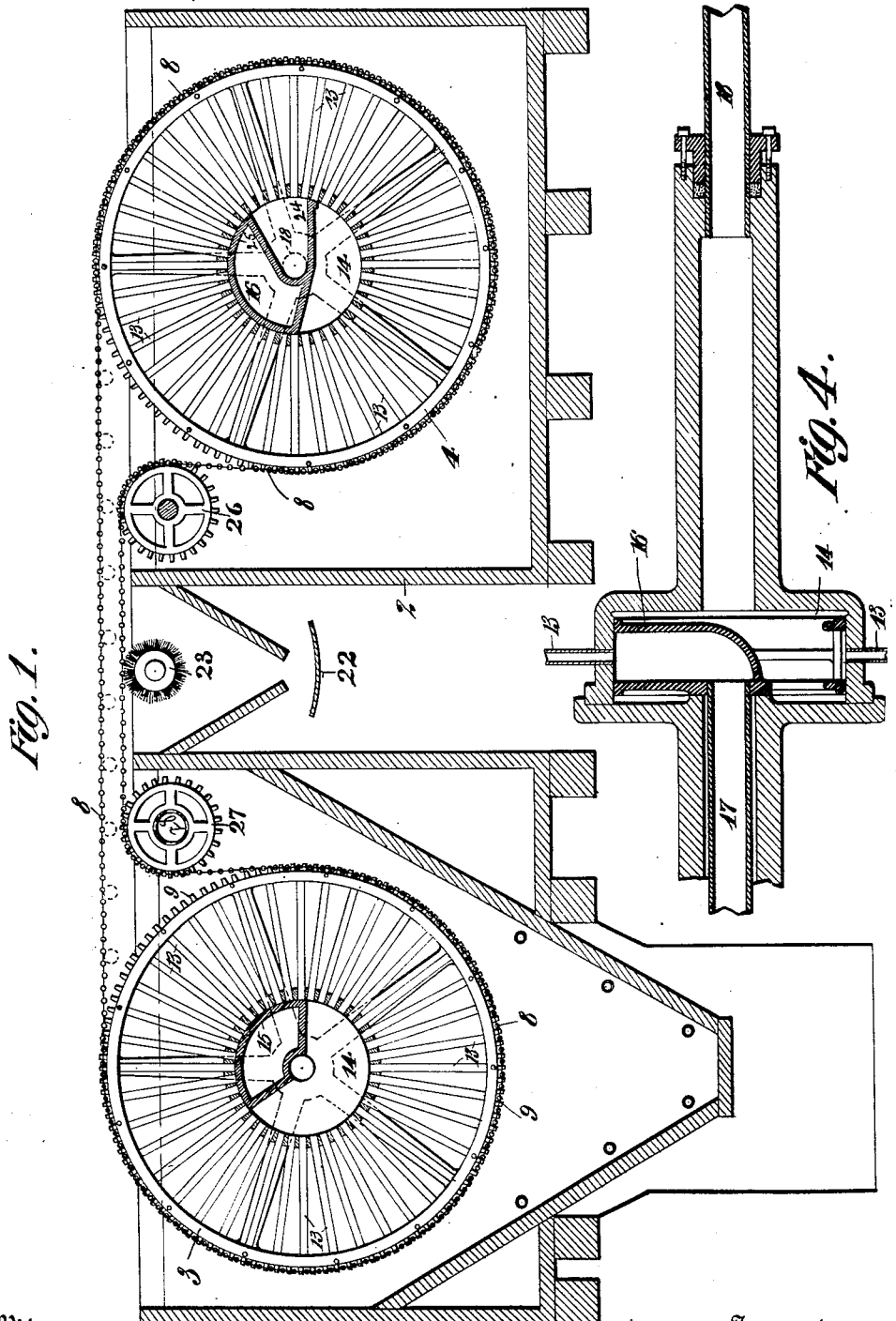

UNITED STATES PATENT OFFICE.

CYRUS ROBINSON, OF MOUNT VERNON, NEW YORK.

APPARATUS FOR RECOVERING VALUES FROM ORE SOLUTIONS.

954,466.

Specification of Letters Patent. Patented Apr. 12, 1910.

Application filed October 3, 1908. Serial No. 456,085.

*To all whom it may concern:*

Be it known that I, CYRUS ROBINSON, a subject of Great Britain, residing at Mount Vernon, county of Westchester, and State of New York, United States of America, have invented a new and useful Apparatus for Recovering Values from Ore Solutions, of which the following is a specification.

One of the principal difficulties met with in the treatment of ores by the cyanid or hyposulfite process is the filtering and washing of the pulp or slime economically. The principal methods in use at the present time employ a series of filtering "leaves," consisting of a frame covered with duck or canvas with separating strips between the two canvas walls, forming cells. These cells are arranged to be connected to a pumping or vacuum system. A number of these leaves are placed in a tank filled with the pulp solution and as the cells are exhausted by means of a pump, the filtered solution containing the values passes through the filtering medium and thence to the precipitation tanks, the slime being deposited on the leaves in a cake. As will be readily seen, at the commencement of the operation when the filtering medium is clean the discharge of the solution through the filtering medium will be very rapid and at the beginning somewhat turbid. This turbidity will continue until sufficient slime is deposited on the canvas or cloth to fill up the interstices and thus aid in the filtration. The leaves are allowed to remain in the tank and the deposit of the slime continued until the flow of solution, due to the resistance of the slime, practically stops—the thickness of the cake formed being generally from 1" to 1½", depending upon the fineness of the slime. It is found economical with low grade material to have a percentage of sands with the slime so that as the cake is built up the resistance does not increase too rapidly. This means, in turn, that the extraction of the values in the coarser material is probably not as good as in the finer material, being a compromise between the cost of operation and the returns from a more complete extraction, and it will be readily seen that if an apparatus be used whereby the thickness of the cake or deposition of slime is kept at say ¼", the operation would be rapid and permit of all the slime or pulp being very fine and giving the corresponding larger extraction of values, means being provided to prevent the turbidity referred to above. After the cake is deposited on the filter it must be washed to extract the solution contained in the cake which carries the same values as the solution discharged to the precipitating tanks; and in some plants all of the filter leaves are lifted out of the pulp tank and placed in a washing tank containing a barren solution of cyanid (the vacuum being kept on the leaves during the transfer) and the barren solution caused to flow through the cake so as to displace the enriched solution. The leaves are then transferred to a third tank and washed with clear water for the recovery of the cyanid solution retained therein. Thus are employed two distinct time consuming steps for a result which I accomplish in much less time and in one step or operation. They are next transferred to a point where the cakes are discharged from the filter leaves by reversing the operation, that is, blowing through from the inside of the cells or pumping water through from the inside. This washes off or discharges all of the slime contained on the cloth and the leaves are ready to be placed again in the pulp tank and the cycle of operations repeated. A plant of this character requires heavy equipment for handling the leaves and cakes and the rapid decrease in the rate of filtration makes a very expensive plant per ton of material treated.

The fundamentals of the extraction of metals by fine crushing and cyanid or other solutions, may be summed up as follows:— First, the material must be crushed fine enough to permit of the solution dissolving the metal. Second, the enriched solution must be filtered from the pulp or slime in a clear condition. Third, the enriched solution remaining in the pulp must be removed from same before the pulp is discharged to the dump.

My invention relates to improvements in apparatuses for recovering values from ore solutions and has for its objects the filtration of the pulp and washing of same continuously, quickly, uniformly and economically, and the following is a description thereof, accompanied by drawings, in which—

Figure 1 is a sectional elevation of my apparatus, Fig. 2 is a central vertical section of tank one of Fig. 1, Fig. 3 is an enlarged sectional detail of a drum, Fig. 4 is an enlarged vertical section through the axis of the drum in tank 2.

The numeral 1 represents a tank in which is contained the solution of slimes, and 2 a tank for containing water for washing the cake of pulp. In tank 1 is a drum, 3. In tank 2 a drum, 4. The peripheries of the drums are arranged to carry perforated wooden blocks, 11. 11. etc., these wooden blocks being fastened to the drum so that there are recesses or chambers 12. 12. on the under side. Communicating with these chambers by means of pipes, 13. 13. is a valve chamber, 14, containing a stationary valve, 15, this valve having a port communicating with the submerged and concentric section of the traveling filtering medium 7, and it will be seen from the drawings that as the drum revolves around the stationary valve communication is progressively made by means of pipes, 13. 13. between chambers 12. 12. at the periphery and the valve port, and that if pump or vacuum be connected to the valve chamber, the solution from the tank will flow through the filtering medium and the valve and that there will be deposited on the suitable traveling filtering medium, 7, slime or pulp. On the other hand, this valve closes communication between the chambers on that portion of the drum not submerged and not touching the belt, and the valve chamber, thus cutting off the vacuum action through that constant sector of the drum. One of the advantages of this feature is to prevent the flow of the unfiltered slimes into the chambers and ultimately mixing with the filtered solution. Each drum has a wrapping of canvas or cloth, 5, securely fastened to and covering its outer periphery, the object of this cloth being to form a second filtering medium and at the same time keep covered the chambers 6. 6. when the filtering medium, 7, is separated from the drum. The traveling filtering medium, 7, has attached to its edges sprocket chains 8. 8., as shown. These sprocket chains engage with sprocket wheels, 9. 10. secured to the ends of the drums. The sprocket wheel, 9, is made laterally adjustable—in the drawings set screws are shown—to permit of keeping the filtering medium, 7., tight along the axis of the drum, and it will be seen that without means for stretching, this medium will wrinkle and not permit of a smooth surface on the drum. This construction for driving the filtering medium and adjusting the same is an important feature of my invention, as I will point out. It is essential to the successful practice of this class of processes that the same be uniformly carried on, and if the cake on the medium should crack, the resistance at that point being less than when the cake is normal, the suction will tend to concentrate at such points, and when these cracks reach the water tank, this increased suction of the water will wash the cracks larger, and the flow of water through the cake will be unevenly distributed.

The drum in tank 2 is constructed the same as in tank 1 with the exception that there is a double valve, 16, having two offset ports in same, these ports communicating with sections of the submerged and concentric filtering cloth on the periphery of the drum by means of pipes and recesses as in tank 1 drum. This valve, as appears from the drawings consists of two rings supporting the compartment 24 which receives the first washing and discharges it through port 17. Adjoining the compartment for a suitable distance the rings are connected by a solid rim or roof 25, which cuts off the vacuum from the corresponding constant sector of the drum. The balance of the space forms a chamber which receives the second washing and discharges it through a port, 18, opposite the port, 17. Tank 2 is filled with clear water and the object of this double valve is to permit of two washings of the pulp in tank 2—the first washing passing through the small port and out through a passage, 17, the second washing passing out through the hub and passage, 18. The first washing will contain enriched solution from the pulp, and the second washing will be very dilute with enriched solution from the pulp. The first washing will go direct to precipitating tanks, and the second washing can be led to other tanks for such treatment as may be necessary to fit it for further use. The washed pulp or slime on the filtering medium coming from tank 2 passes into the range of a washing or cleaning brush 23 and is discharged from the cloth on to a belt conveyer 22 or other suitable device for removing the same. The filtering medium being cleaned travels onward into the tank 1 for the start of a new cycle of operation.

It will be seen from the above that with this apparatus a continuous filtering and washing can be obtained with a deposit of a thin layer of pulp on the cloth permitting of a rapid and uniform flow of solution through the filtering medium, and, having means to vary the speed of the pumps, the exact requisite proportion of washing in tank 2 can be obtained. Furthermore, with this apparatus, practically a complete recovery of the cyanid is obtained in an economical manner, and it is, therefore, possible to keep the solution in the agitating tanks at uniform strength, decreasing the risk of under treatment of the slimes as is the case where it is attempted to use up in the agitating tanks all of the cyanid before filtering. In tank 1, it will be necessary to agitate or keep in circulation the pulp and solution, and with cyanid, I would use air pipes, as shown at 21, located on the inclined sides of the tank. For hyposulfite, or other solutions where air would be a detriment, any known form of mechanical agitating device can be used.

As shown, the apparatus is driven by means of the sprocket wheel 26, and an idler sprocket wheel 27 is rotatably mounted on the supply pipe 28, for convenience of construction.

I claim:—

1. An apparatus for recovering values from solutions of ore, which comprises means for immersing an endless filtering medium in the ore solution and in a wash, means for extracting the solution and the wash from the tanks containing them through said medium, and means for removing the deposit from said medium.

2. Mechanism for the continuous filtration of ore slimes, embodying tanks, revoluble drums in said tanks, an endless filtering medium passing around said drums, means for moving said filtering medium synchronously with said drums and between the same, means for causing the solution and the wash to flow through said medium, means for conveying away the filtered material, and means for removing the cake from the medium.

3. In an apparatus for recovering values from ore solutions, the combination with a solution tank and a washing tank of an endless filtering medium, means for causing said medium to pass through and between said tanks, means for extracting the liquids from said tanks through said medium, and means for removing the deposit from said medium.

4. An apparatus for recovering values from ore solutions, which comprises a solution tank, a wash tank, an endless filtering medium, means for continuously conveying the deposit on said medium in a homogeneous condition from the solution tank to the wash tank, and means for removing the deposit after washing.

5. Mechanism for filtering ore slimes, which embodies perforated, revoluble drums provided with pervious coverings, tanks containing the drums, and a filtering material passing from one tank to the other and around said drums, substantially as described.

6. Mechanism for filtering ore slimes, which comprises revolving drums in tanks, an endless filtering medium passing from one drum and tank to the other, means for preserving the even surface of said medium, and means for drawing the contents of said tanks through said medium.

7. In mechanism of the class described, a drum provided with perforated chambers transversely the periphery thereof and having ports in the floors thereof connecting with a discharge port, and a pervious covering to said periphery.

8. In an apparatus of the class described, a drum provided with externally perforated peripheral chambers having a pervious covering and a port in the floors thereof, ducts leading from said ports to a valve chamber, and a valve for regulating the flow of solution through said covering, substantially as described.

9. In an apparatus of the class described, the combination of a revoluble drum and a filtering medium passing around said drum provided with means which are positively engaged by means on the drum so as to move said medium synchronously therewith.

10. In an apparatus of the class described, means for preserving the even surface of the filtering medium, which consists in the positive engagement of said medium by the drum and mechanism for adjusting the belt laterally.

11. In mechanism of the class described, the combination of an endless filtering medium having sprocket chains on its edges and drums provided with sprocket wheels adapted to coöperate with said chains.

12. In mechanism of the class described, the combination of an endless filtering medium and means for laterally adjusting the same.

13. In an apparatus of the class described, a drum carrying sprocket wheels at its ends adapted to engage with the filtering medium and means for adjusting one of said sprocket wheels.

14. In mechanism of the class described, means for effecting a plurality of filtering operations during a single revolution of the drum and means for withdrawing the filtered solutions separately.

CYRUS ROBINSON.

Witnesses:
 FRANCIS RISK,
 E. WAGNER.